United States Patent

Perlman et al.

[15] 3,644,839

[45] Feb. 22, 1972

[54] TRANSFERRED ELECTRON AMPLIFIER

[72] Inventors: Barry Stuart Perlman, Hightstown; Thomas Edward Walsh, Kearny, both of N.J.

[73] Assignee: RCA Corporation

[22] Filed: Dec. 29, 1969

[21] Appl. No.: 888,477

[52] U.S. Cl. .......................................330/5, 330/34, 330/53
[51] Int. Cl. ...........................................................H03f 3/04
[58] Field of Search ..................................330/5; 331/107 G

[56] References Cited

UNITED STATES PATENTS

| | | |
|---|---|---|
| 3,509,478 | 4/1970 | Thim .........................................330/5 |
| 3,526,844 | 9/1970 | Bartelink et al. ...........................330/5 |

OTHER PUBLICATIONS

Enstron et al., " IEEE Journal of Solid– State Circuits," Dec. 69 pp. 374–376.
Hines et al., " IEEE Journal of Solid– State Circuits," Dec. 69, pp. 370–374.

*Primary Examiner*—John Kominski
*Assistant Examiner*—Darwin R. Hostetter
*Attorney*—Edward J. Norton

[57] ABSTRACT

A transferred electron amplifier characterized by the uncompensated bulk-type material in the active region having an $nL$ product larger than about $5\times10^{11}$ cm.$^{-2}$ is described where $n$ is the carrier density and L is the length of the material between terminals. The amplifier provides high power, signal amplification at microwave frequencies near the transit-time frequency.

9 Claims, 4 Drawing Figures

INVENTORS
Barry S. Perlman &
Thomas E. Walsh
BY Robert L. Troike
ATTORNEY

INVENTORS
Barry S. Perlman &
Thomas E. Walsh
BY Robert L. Troike
ATTORNEY

TRANSFERRED ELECTRON AMPLIFIER

The invention herein was made in the course of or under contract or subcontract thereunder with the Department of the Navy.

This invention relates to transferred electron devices and more particularly to a bulk-type transferred electron amplifier where the active region is supercritically doped.

Supercritically doped bulk transferred electron oscillator devices are known and are presently being considered for use as relatively high power solid state microwave generators. The term "supercritically doped" refers to transferred electron devices such as those made of epitaxial Gallium Arsenide (GaAs) where the bulk region has an $n$L product greater than $\approx$5×10a11 CM.$^{-2}$, where $n$ equals the carrier density of the bulk material and L equals the length of the sample. When such a bulk material has a DC electric field thereacross that exceeds a given threshold, such as about 3 kilovolts per centimeter, for example, the drift velocity of the conduction of electrons as a function of the electric field decreases. The transfer of electrons from high-velocity states to low-velocity states takes place in a short time compared to the microwave signal, giving rise to a bulk negative resistance by the transferring of electrons from a high-velocity to a low-velocity state. If the bulk material is supercritically doped, dipole layers form at or near the cathode of the material and move through the material with the drift velocity of the electron stream and disappear at the anode whereupon a new domain is formed and the process is repeated. The fundamental frequency of oscillation will be approximately equal to the transit-time frequency ($f_t$). The transit-time frequency ($f_t$) equals $V_o$/L, where $V_o$ is the average drift velocity and L is the length of the active material between the terminals of the device. While higher power oscillators have been associated with the supercritically doped material biased above threshold, amplifiers amplifying a frequency near the transit-time frequency with such material were previously unknown and were generally considered not possible due to what was considered an inherent steady oscillating state, associated with a dipole instability.

Stable amplification using transferred electron devices has been observed with bulk Gallium Arsenide transfer electron devices having $n$L products less than $\approx$5×10$^{11}$ cm.$^{-2}$ where $n$ equals carrier density of the Gallium Arsenide material and L equals the sample length. A complete description of these devices may be found in the article entitled "Microwave Amplification in a DC biased Semiconductor" by Thim, H. W. et al. in Applied Physics Letters, Vol. 7—167, Sept. 1965. Domain formation is inhibited in these above subcritical doped devices and stable amplification occurs at frequencies near the transit-time frequency $f_t$.

In supercritically doped devices having $n$L products greater than $\approx$5×10$^{11}$ cm.$^{-2}$, the negative resistance associated with the propagating domain has been used to amplify signals at frequencies significantly removed from the transit-time frequency. This is described by H. W. Thim in an article in IEEE Transactions, Electron Devices, ED. 14, pages 517–522, Sept. 1967. The article is entitled "Linear Microwave Amplification with Gunn Oscillators." While oscillations in this case exist at the transit-time frequency, they are isolated from the signals being amplified by a resonant trap.

Although these devices have provided amplification they are not practical at the medium to high microwave frequencies such as at the C- and X-band of frequencies where high duty cycles or CW operation is required with significant power output. It is difficult and extremely costly to produce in practice uncompensated material where the doping density is less than about $\approx$5×10$^{14}$ cm.$^{-3}$ on a production type scale. The compensated material known to date has a negative temperature coefficient of resistance and consequently these devices are restricted to low duty cycle operation below one percent, where the heating is insufficient to cause ionization. For operation therefore, for practical purposes, the lowest doping density is that of about 5×10$^{14}$ cm.$^{-3}$. If it is desired to operate at the C- and X-band frequencies, the length L of the material is defined. A length at X-band would be on the order of 10 microns and at C-band on the order of 20 microns. This results in a $n$L product of 5×10$^{11}$ to 1× 10$^{12}$ cm.$^{-2}$. As stated previously, these $n$L products have been heretofore associated with instability. Also it is desired to provide higher power solid-state devices capable of amplification at higher power levels.

It is an object of the present invention to provide a transferred electron amplifier using uncompensated material with a positive temperature coefficient of resistance in which the active region is supercritically doped providing stable linear amplification over a wide dynamic range in the frequency band around the transit-time frequency.

Briefly, this and other objects of the present invention are provided by a transferred electron amplifier for amplifying microwave signals at or near the transit-time frequency. A transferred electron semiconductor device is provided having an anode and a cathode terminal. The device has an active region between the terminals wherein the product of the doping density times the length of the active region between the terminals is greater than 5×10$^{11}$ cm.$^{-2}$. The device is biased above threshold where transfer of electrons from a high to a low mobility subband occurs and the device is properly loaded so as to suppress oscillations of said device.

DETAILED DESCRIPTION

A description of an embodiment of the present invention follows in conjunction with the drawing wherein.

Figure 1:
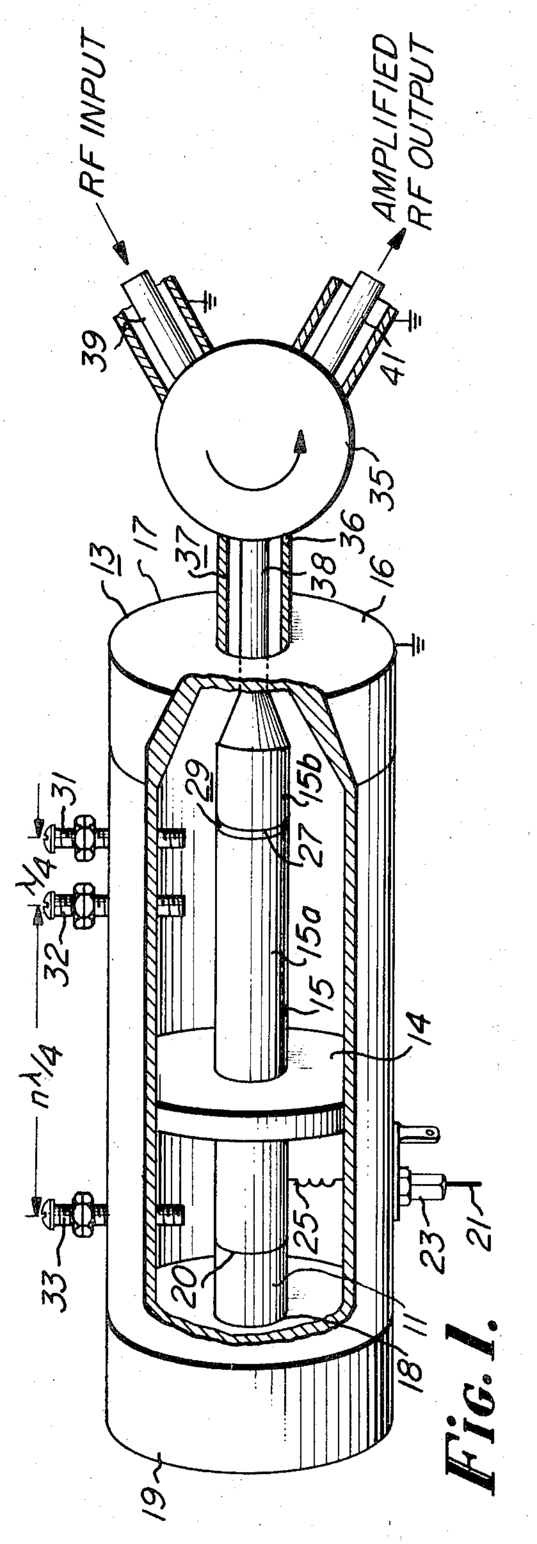
FIG. 1 is a circuit schematic of a transferred electron amplifier.

Referring to FIG. 1, there is illustrated a reflection-type amplifier 10 in accordance with one embodiment of the present invention. A bulk Gallium Arsenide (GaAs) negative conductivity device package 11 is mounted in a coaxial transmission line structure 13. The coaxial transmission line structure 13 includes a center conductor 15 spaced from an outer conductor 17 by a low dielectric constant disk 14. The center conductor 15 and outer conductor 17 are dimensioned and arranged to provide a 50-ohm transmission line. In the example illustrated in FIG. 1, the center conductor 15 is 100 mils in diameter and the inner diameter of the outer conductor 17 is 230 mils. The outer conductor 17 is coupled to ground potential. Terminating one end of the transmission line 13 is a reflective conductive termination 19. The conductive termination 19 also serves as a heat sink. The device package 11 is mounted such that the device 11 is connected between the center conductor 15 and the conductive termination 19 with the cathode terminal 18 coupled to conductive termination 19 and the anode terminal 20 connected to the center conductor 15. Proper DC electric field bias across the device is provided by a DC source (not shown) applied to terminal 21. The DC source is coupled through feedthrough capacitor 23 and RF choke coil 25 to the center conductor 15. The center conductor 15 is in turn connected at terminal 20 to one end of diode package 11. A piece of dielectric material 27 separates the portions **15*a* and 15*b* of the center conductor 5 to form a capacitor 29. Capacitor 29 acts both as a RF coupling capacitor for the input and reflected RF signals and to block the DC bias. The bias source is isolated from the RF energy source by means of the RF choke coil 25 and the RF bypass capacitance provided by the feedthrough capacitor 23. The in-line variable impedance tuning screws 31, 32 and 33 are positioned one-quarter λ/4 wavelength apart or $n$ multiple of quarter wavelengths apart. These three tuning screws are used to provide the necessary impedance transformation between the device in the package 11** and the 50-ohm load of the transmission line and to sufficiently load the amplifier to suppress oscillations. For a particular amplifier response, a specific impedance condition by means of these tuning screws is provided. These three tuning screws in the coaxial transmission line are the equivalent of three quarterwave lines in series.

Another effective means for introducing a broadband impedance transformation is to replace the screw 33 nearest the device 11 by a single dielectric disk (dielectric constant of about 2, for example) between the inner and outer conductor like the spacer 14. This transformer disk is placed adjacent to the anode terminal 20 of the device 11. The disk has a length along the direction of propogation of signals therealong equal to about one-quarter of an electrical wavelength so as to provide a distributed quarterwave impedance transformer. RF input signals are coupled into and out of the reflection-type amplifier 10 by means of a circulator 35 shown schematically in FIG. 1. The circulator may be, for example, a coaxial circulator of the type having a center conductor and an outer conductor. The outer conductor is coupled to ground potential. The center conductor 38 of one of the arms 37 is connected to portion 15*b* of center conductor 15. The outer conductor 36 is connected to outer conductor 17 by means of conductor 16. The center conductor 15 is tapered to meet with center conductor 38. The ratio of the sizes of the inner and outer conductors is arranged to maintain a continuous 50-ohm line. In the operation of the circulator arrangement of FIG. 1, RF input signals are applied across one arm 39 of circulator 35 and are coupled nonreciprocally to arm 37. The reflected amplified RF signal propagates along the transmission line 13 and the arm 37 and is coupled nonreciprocally to output arm 41.

Figure 2:
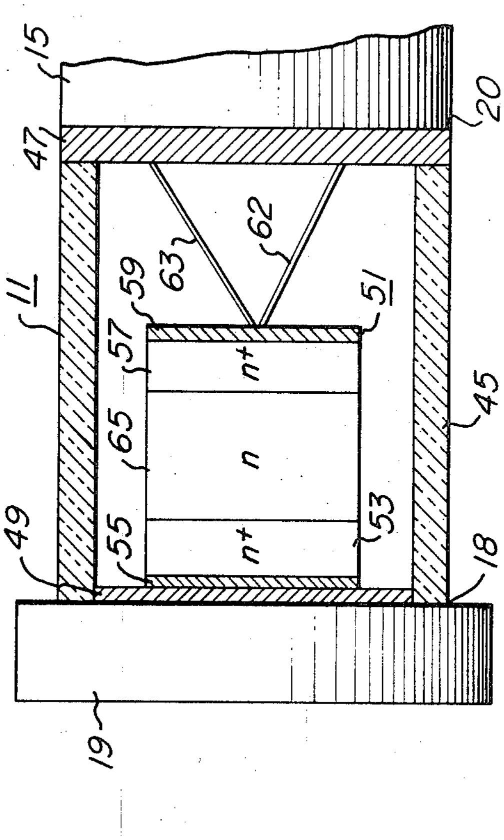
FIG. 2 is a cross section of the device package.

Referring to FIG. 2 there is shown in cross section the device package 11. The diode package 11 is about 100 mils long and about 50 mils in diameter. The diode package 11 comprises a hollow cylindrical body 45 of insulator material. A disk 47 of conductive material covers one end of the body. This disk 47 of conductive material is terminal 21 and is positioned adjacent to the center conductor 15 at terminal 20. A conductive heat sink 19 having a thin layer 49 of gold is positioned across the terminal 18 end of the body 45 of insulator material. An $n^+$–$n$–$n^+$ epitaxial Gallium Arsenide sandwich structural device 51 is mounted within the body 45. One $n^+$ layer 53 has a layer 55 of silver thereon to provide a first terminal or cathode terminal of the device. The diode 51 is mounted such that the layer 55 of silver is placed adjacent to and in contact with the layer 49 of gold. The other $n^+$ layer 57 has a layer 59 of silver thereon to provide the second terminal or anode terminal of the device 51. Gold wires 62 and 63 are connected between the silver layer 59 and the conductive disk 47 adjacent to center conductor 15. Since both the DC bias voltage and the RF signals are applied along the center conductor 15 connected to conductive disk 47 and wires 62 and 63, both the DC bias voltage and the RF signal are applied along the wires 62 and 63 to the device 51 at terminal layer 59.

The device 51 was constructed as illustrated of a $n^+$–$n$–$n^+$ configuration. The total spacing between the silvered ends 55 and 59 is about 26 microns long. The $n$ layer 65 is the active layer and this is 20 microns long. The $n^+$ layer 53 is about 4 microns and the $n^+$ layer 57 about 2 microns. The dimension of the device 51 as viewed at the silvered ends is 17×17 mils.

The device was epitaxial Gallium Arsenide (GaAs) $A_{The}$ $n^+$–$n$–$n^+$ geometry was grown using a vapor hydride process. The details of the growth process using arsine has been described in the following articles:

J. J. Tietjen and J. A. Amick, "Preparation and Properties of Vapor Deposited Epitaxial GaAs (1–X) using Arsine and Phosphine," J. Electrochem. Soc., 113, p. 724, (1966), and R. E. Enstrom and C. C. Peterson, "Vapor Phase Growth and Properties of GaAs Gunn Devices," Trans. Metalurgical Soc. AIME (American Institute of Metalurgical Engineers), 239, p. 413, (1967).

Figure 3:
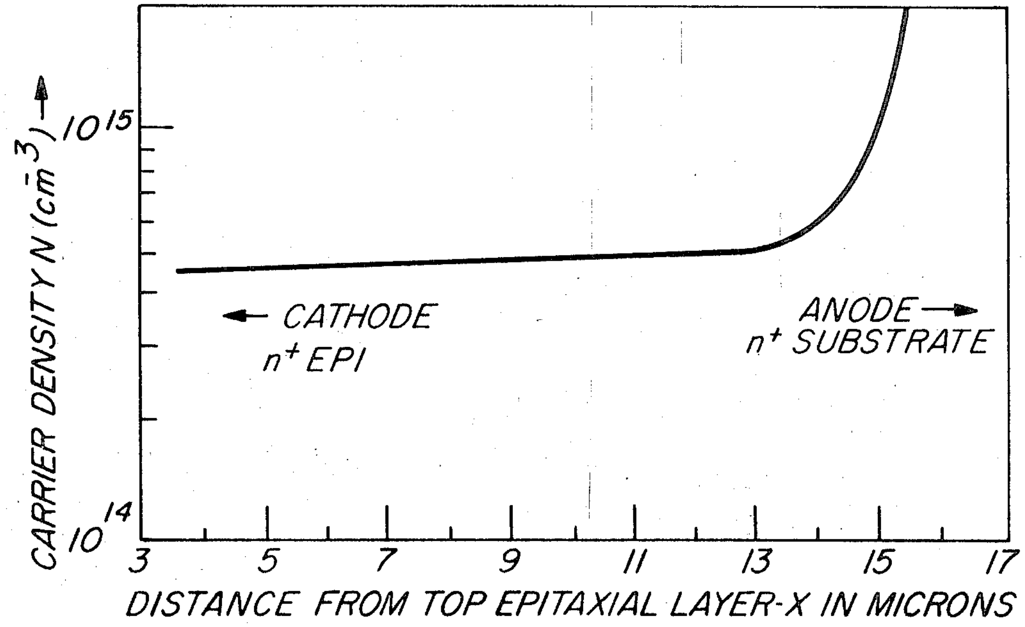
FIG. 3 is a measured carrier density profile of the active region of the device of the transferred electron amplifier, for a typical device.

The $n$ layer for C-band frequency as mentioned above was 20 microns and the doping densities was about $1\times10^{15}$ cm.$^{-3}$. The material was not compensated and consequently, is characterized by a positive temperature coefficient. Room temperature Hall measurements were made on the device just before and just after the device was grown. Room temperature mobilities were typically 6,000 cm.$^{-2}$ per volt second. Doping profiles of the device were made. FIG. 3 shows the measured doping density profile for a typical epitaxial device 51 used for providing the amplifier.

Figure 4:
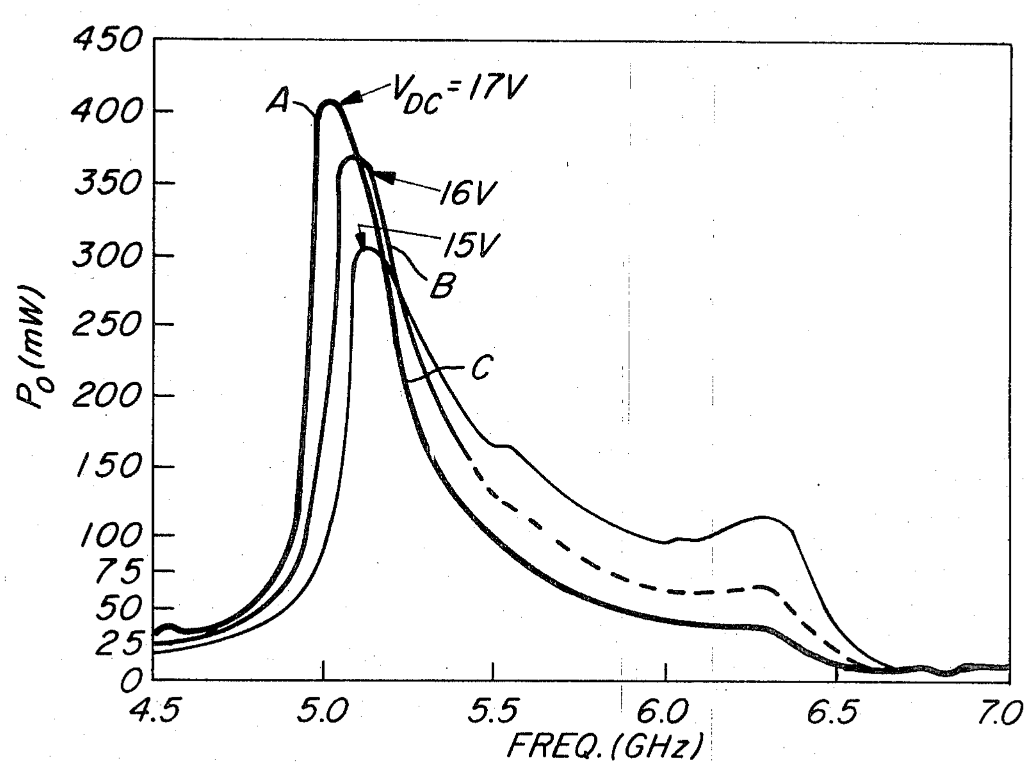
FIG. 4 is a plot of power output (milliwatts) vs. frequency (gigaHertz) for a transferred electron amplifier like that shown in FIG. 1.

Referring now to the arrangement shown in FIG. 1, an input signal near the transit-time frequency is applied to arm 37 of circulator 35. The signal is coupled along arm 37 and across the narrow conductor 15 and the outer conductor 17. A DC bias of three times the threshold is applied at terminal 21 which in turn is coupled across the device package 11. The threshold of such a device would be about 3,000 volts per cm. or for a 20-micron device about 6 volts. The DC bias applied was about three times the threshold or about 18 volts. A wide band spectrum analyzer, an oscilloscope and a high power level indicator were coupled at the output arm 41 of circulator 35. Upon the application of the CW (continuous wave) signals at about 5 gigaHertz (gHz), the device produced 5 gHz oscillations with a delivered output power of 500 milliwatts. By adjusting the tuning screws 31, 32 and 33 described above spaced at one-quarter wavelength intervals or multiples thereof so as to adjust the load impedance and observing the output from a sensitive spectrum analyzer, oscillations were quenched producing the series of response curves illustrated in FIG. 4. FIG. 4 illustrates a series of response curves for various DC biasing levels with a power input in each case of 24 milliwatts. Curve A of FIG. 4 shows that the amplifier provides an output power of 400 milliwatts at the operating frequency of about 5 gHz with a DC bias level of 17 volts. It can be noted observing curves B and C of FIG. 4 the change in the power output associated with the bias changes respectively for 16- and 15-volt DC bias. Load-impedance measurements were made on the device for various tuning conditions and bias voltages. A narrow band real load impedance of 25 ohms was measured for the high-gain response curves in FIG. 4. It has been demonstrated therefore that a stable amplifier can be provided using supercritically doped transferred electron devices to obtain high-power amplification if sufficient loading is provided to suppress oscillations. Similar gains have been demonstrated at X-band of frequencies using similar geometry to that shown in FIGS. 1 and 2. In the case of X-band amplifiers, the length of the active $n$ region was 10 microns when operating within the 8 to 10 gHz frequency range. The biasing voltage was again about three times threshold or for a 10-micron length between terminals would be about 9 volts. The doping density again was in the low $10^{15}$ cm.$^{-3}$ range. The amplifier provided a gain of 10 db. with an output power of up to 100 milliwatts.

At this point it is believed desirable to point out certain features of the stable amplifiers heretofore described. A first feature is that the active device is placed in a transmission line geometry with the device between the center conductor of a coaxial line and the outer conductor. A second feature is that amplification has been one of reflected gain where the input signal coupled along a transmission toward the device is reflected back along the line from a short across the line. A third feature is that the device is located near the shorted end and consequently at low-impedance point. Also, the value of the negative resistance for a bias well over threshold such as two to three times threshold provides a saturated power output near that maximum power and at frequency at which the device normally operates as an oscillator. The measurement of the load impedance indicates the need for the circuit to present a low real load impedance. The diode in the disclosed circuit arrangement appears to exhibit a negative resistance between its cathode and anode terminal. By presenting a low real load impedance such as that described at about 25 ohms, a net loop resistance which is positive at the desired frequency of operation is exhibited and consequently a stabilized gain is provided.

The above responses were those realized when applying a continuous wave (CW) input signal to the amplifier. A similar arrangement was operated with a pulse type input signal. The active device was also mounted in a coaxial transmission line between a center conductor and outer conductor. A short was placed across the transmission line. The device was mounted near the short or reflected end. Using similarly doped materials and again operating as a reflection-type amplifier, higher gains were recorded than that provided in CW with output peak power in excess of 1 watt at C-band. The particular devices were like that of the uncompensated diode device 51 in FIG. 1. The devices were 20×20-mil square when viewed toward the terminals with the length L of active region of the device 51 being 20 microns long between terminals. The material was fabricated in an $n^+$–$n$–$n^+$ sandwich structure grown on a $n^+$ substrate in the same manner as described previously in the cited references and the active region has a carrier concentration of about $2\times10^{15}$ cm.$^{-3}$. The device was like that described above placed in a 50-ohm transmission line with the device being tuned by a sliding short behind the device and a tuning screw like one of the screws shown in FIG. 1 which could slide along the transmission line toward and away from the device. The pulsed input signal was coupled into by means of a circulator in an arrangement like that described and shown in connection with FIG. 1. The device was biased when operated at C-band at about three times the threshold or at about 18 volts. The pulsed output signal was observed at the output arm of the circulator using a spectrum analyzer and a power meter. The sliding short and the sliding tuning screw were adjusted to suppress oscillations. An input signal applied was within the 4 to 7 gHz frequency range. Amplification was recorded within 50 MHz (megahertz) of the original oscillation frequency. The output signal in the frequency range of 4 to 7 gHz (gigaHertz) was amplified about 10 db. compared to the input and the output gain remained constant until the output power reached 2 watts. The center frequency of the amplifier could be tuned over the 4 to 7 gHz frequency range by a combination of adjustment of circuit loading and bias voltage tuning.

It is hereby shown by the arrangement described above that transfer electron devices having large $n$L products can be stabilized to provide reflection type amplification and that peak output powers in excess of one watt at C-band can be obtained from these devices. This makes these devices potentially useful in the higher power microwave or medium frequency range which are inaccessible to tunnel diodes and transistors at present.

High power may be obtained using the supercritical material biased significantly above threshold (for example 2.5 to 3 times). Since these amplifier devices operate at higher biasing voltages and are characterized by lower resistivity than those previously provided, these devices are capable of operating with linear gain at higher power levels than those previously known. Consequently, the amplifier described herein becomes highly useful in the medium to high microwave frequency range where solid state devices are desirable.

What is claimed is:

1. A transferred electron amplifier for linearly amplifying microwave signals at the transit time frequency comprising:
   - a transmission line,
   - a transferred electron semiconductor device located in said transmission line having an anode terminal and a cathode terminal, said device having an active region wherein the product of the doping density times the length of the active region between said terminals is greater than $5\times10^{11}$ cm.$^{-2}$,
   - impedance means located in said transmission line and physically spaced from said device for loading said device,
   - means for applying a DC electric field across said device with a value sufficiently above that of threshold where the transfer of electrons from a high to low mobility subband occurs in said active region so that with said impedance means for loading said device any oscillations by said device are suppressed.

2. The combination as claimed in claim 1 wherein the transfer of electrons from a high-velocity state to a low-velocity state takes place in a short time compared to that of the frequency of said microwave signal.

3. The combination as claimed in claim 1 wherein said impedance means is of sufficient magnitude to prevent the formation of space charge dipole layers.

4. The combination as claimed in claim 1 wherein said impedance means presents a low real impedance.

5. A reflection-type amplifier for providing reflected amplification of microwave signals below 20 gHz, comprising:
   - a coaxial transmission line having an inner and outer conductor, said transmission line having first and second ends,
   - a transferred electron semiconductive device having first and second terminals, said device having an active region wherein the product of the doping density times the length of the active region between said terminals is greater than $5\times10^{11}$ cm.$^{-2}$, said device having said first terminal coupled to said inner conductor and the second terminal coupled to said outer conductor at said first end in a manner to provide reflection of said microwave signals,
   - means located at said second end of said transmission line opposite said first end for coupling microwave signals near the transit-time frequency of said device into said transmission line and for coupling the reflected and amplified microwave signals out of the transmission line,
   - impedance means for loading said device, and
   - means for applying a DC electric field bias across said device with a value sufficiently above that of threshold where transfer of electrons from high to low mobility subbands occurs in said active region so that with said impedance means for loading said device any oscillations of said device are suppressed.

6. The combination as claimed in claim 5 wherein said loading means includes at least one tuning stub extending from the outer conductor toward the inner conductor.

7. The combination as claimed in claim 6 wherein said loading means includes at least three tuning screws in line at an integral number of one-quarter wavelengths apart.

8. The combination as claimed in claim 5 wherein the real impedance presented to the device by said loading means is greater than the negative impedance of the device.

9. The combination as claimed in claim 5 wherein said electric field bias is greater than 2.5 times threshold.

* * * * *